US008545921B2

(12) United States Patent
Gonus et al.

(10) Patent No.: US 8,545,921 B2
(45) Date of Patent: Oct. 1, 2013

(54) CHOCOLATE COMPOSITION

(75) Inventors: Philippe Gonus, York (GB); Thierry D. Fiaux, Ursy (GB)

(73) Assignee: Nestec S.A., Vevey (CH)

(*) Notice: Subject to any disclaimer, the term of this patent is extended or adjusted under 35 U.S.C. 154(b) by 907 days.

(21) Appl. No.: 11/719,628

(22) PCT Filed: Nov. 22, 2005

(86) PCT No.: PCT/EP2005/012486
§ 371 (c)(1),
(2), (4) Date: May 17, 2007

(87) PCT Pub. No.: WO2006/056401
PCT Pub. Date: Jun. 1, 2006

(65) Prior Publication Data
US 2009/0074937 A1    Mar. 19, 2009

(30) Foreign Application Priority Data
Nov. 24, 2004  (GB) .................................. 0425888.5

(51) Int. Cl.
*A23D 7/00*  (2006.01)
(52) U.S. Cl.
USPC ........................................................ 426/601
(58) Field of Classification Search
USPC ........................................................ 426/607
See application file for complete search history.

(56) References Cited

U.S. PATENT DOCUMENTS

| 1,467,587 | A | * | 9/1923 | Neilan et al. ............... 554/10 |
| 2,539,518 | A |   | 1/1951 | Mayberry |
| 2,586,615 | A |   | 2/1952 | Cross |
| 2,626,216 | A | * | 1/1953 | Cross ............................ 426/654 |
| 4,701,337 | A | * | 10/1987 | Frost et al. ................... 426/548 |
| 4,895,732 | A |   | 1/1990 | Suwa et al. |
| 5,066,510 | A |   | 11/1991 | Ehrman et al. |
| 5,380,538 | A | * | 1/1995 | Wheeler et al. ............. 426/99 |
| 5,709,903 | A |   | 1/1998 | St. John et al. |
| 5,849,353 | A |   | 12/1998 | Baker et al. |
| 6,210,739 | B1 |  | 4/2001 | Nalur |

FOREIGN PATENT DOCUMENTS

| EP | 0 390 408 | 10/1990 |
| GB | 706 506 | 3/1954 |
| GB | 709 244 | 5/1954 |
| JP | 2003-299442 | 10/2003 |

OTHER PUBLICATIONS

Lonchampt, P. ; Hartel, R.W. Fat bloom in chocolate and compound coatings. Eur. J. Lipid Sci. Technol. 106(2004):258.*
Chaiseri, S; Dimick, P.S. Dynamic crystallization of cocoa butter I Characterization of simple lipids in rapid and slow nucleating cocoa butters, and their seed crystals. JAOCS 72(12) (2005) : 1491.*

* cited by examiner

*Primary Examiner* — Humera Sheikh
*Assistant Examiner* — Subbalakshmi Prakash
(74) *Attorney, Agent, or Firm* — K&L Gates LLP

(57) ABSTRACT

The invention relates to chocolate compositions where the fat phase comprises at least cocoa butter and optionally milk fat and/or a cocoa butter equivalent and the chocolate can be liquefied and re-solidified without bloom and without a pre-crystallization step.

13 Claims, 18 Drawing Sheets

A        B

C        D

E        F        G

A

B

C

D

E

F

G

CHOCOLATE COMPOSITION

FIELD OF THE INVENTION

The present invention relates to a chocolate that can be liquefied and re-solidified without the formation of bloom without a pre-crystallization step.

BACKGROUND OF THE INVENTION

The principal fat in chocolate is cocoa butter. Cocoa butter is obtained pressing cocoa beans (normally fermented and roasted) to extract the fat contained within the beans. This fat is polymorphic which means that it can crystallise in a number of solid phases of the same chemical composition that differ among themselves in crystalline structure but yield identical liquid phases on melting. In the textbook *Industrial Manufacture and Use* (third edition) edited by S. T. Beckett, pages 218 and 219, six polymorphic forms of cocoa butter are mentioned. Their properties are set out in Table 1.

TABLE 1

| Form | Melting point ° C. | Chain packing |
|---|---|---|
| I | 16-18 | Double |
| II | 21-22 | Double |
| III | 25.5 | Double |
| IV | 27-29 | Double |
| V | 34-35 | Triple |
| VI | 36 | Triple |

Forms V and VI are the most stable forms of cocoa butter. When chocolate is properly tempered the cocoa butter will crystallize in Form V. Rapid cooling of a molten untempered chocolate mass produces relatively unstable polymorphic forms of cocoa butter. These lower polymorphic forms tend to transform to higher melting, more stable forms. This regrowth of crystals manifests itself in surface defects such as fat bloom. This is a whitish haze or mottling on the surface and makes chocolate appear unpalatable. Fat bloom on untempered chocolate appears rapidly and is particularly severe. The crystal structure of the untempered chocolate gives it a granular mouthfeel. Untempered chocolate does not contract as it crystallizes like tempered chocolate and so is difficult to demould.

The object of tempering, sometimes called pre-crystallization, is to develop a sufficient number of seed crystals to encourage the total fat phase to crystallize as Form V. The most commonly used method of tempering involves the steps of: complete melting; cooling to the point of crystallization; crystallization; and melting out unstable crystals. However other tempering methods are used such as the direct addition of a source of fat crystals in the correct polymorphic form; this operation is called seeding.

Fat bloom can also occur on tempered chocolate. This may be associated with a transition from form V to form VI. Fat bloom on tempered chocolate can occur when filling fats migrate into the chocolate, or when the chocolate is subjected to elevated or fluctuating storage temperatures. If chocolate, which had originally been correctly tempered, is liquefied and then re-cooled it will exhibit the severe bloom of untempered chocolate. This problem of bloom after the chocolate has been liquefied and cooled down can occur in hot countries, or where chocolate products are left in an unsuitable location, such as in a car in the sunshine.

Over the years, many vegetable fats have been identified which can be used as an alternative to cocoa butter. In the textbook *Industrial Manufacture and Use* (third edition) edited by S. T. Beckett, pages 307 to 322 these are divided into two groups; cocoa butter equivalents (CBEs) which are vegetable fats with similar chemical and physical characteristics to cocoa butter and hence can be used interchangeably with cocoa butter in any recipe, and cocoa butter replacers (CBRs) which are vegetable fats with similar physical, but not chemical, characteristics to cocoa butter that can only be used to replace cocoa butter in more limited applications.

In many countries, the composition of material sold as "chocolate" is controlled by law. Legislation varies from country to country, but material sold as chocolate is often limited to only having fat extracted from cocoa, or to mixtures of fat extracted from cocoa and defined cocoa butter equivalents. Even in countries where it may be legal to sell chocolate containing vegetable fats obtained from sources other than cocoa there may be a strong consumer preference for chocolate made exclusively with milk and/or cocoa derived fat.

Bloom gives an unpleasant aspect to chocolate, and many attempts have been made to try to retard appearance of bloom. One of the most common approaches to solve this problem is to add bloom inhibitors such as milk fat, or proprietary vegetable fat bloom inhibitors such as Prestine™ (Loders Croklaan). Although these have some effect in controlling the fat bloom caused by form V to form VI transitions, they do not control the bloom which occurs after the chocolate is heated to the point where it is liquid and then allowed to cool. In other words, they do not remove the need to re-temper after melting.

JP2003299442 to Fuji Oil describes a non tempering chocolate composition with bloom resistance. However, this composition includes non-cocoa fats such as lauric fat so would not be acceptable as "chocolate", from a legal point of view, in many countries. Compositions which temper by seeding are also available. Fuji Oil supply seeding material rich in 1,3-behenoyl, 2-oleolglycerol. This triglyceride has a melting point of about 53° C. which means that chocolate containing this material can be heated above its usual melting point but below the melting point of 1,3-behenoyl, 2-oleolglycerol and still cool without bloom as the residual solid 1,3-behenoyl, 2-oleolglycerol is able to re-seed the chocolate. A disadvantage of 1,3-behenoyl, 2-oleolglycerol is that it is not derived from cocoa butter and is not permitted in chocolate in countries such as the members of the European Union.

*Industrial Manufacture and Use* pages 317 to 320 describes both lauric and non-lauric cocoa butter replacers which do not require tempering. However, these fats are generally not permitted in material sold as chocolate. Significant amounts of cocoa butter cannot be mixed with these without causing soft products and a likelihood of bloom formation. This can make chocolate-like materials based on cocoa butter replacers more prone to bloom than chocolate due to incompatibility with cocoa butter in cocoa powder used to provide the chocolate flavour. Lauric cocoa butter replacers can tolerate up to 5% cocoa butter in the fat phase, white non-lauric cocoa butter replacers can tolerate up to 25% cocoa butter in the fat phase.

One popular way of consuming chocolate is as a chocolate fondue. In a chocolate fondue, food items such as pieces of fruit, biscuits or nuts are dipped into melted chocolate before being eaten. Conventionally, if the chocolate fat phase is predominantly milk fat and/or cocoa butter, the chocolate will bloom when it is cooled down. If the consumer wishes to keep some of the remaining chocolate for another chocolate fondue at a later date, they will simply cool the chocolate at room temperature, or perhaps place it in a fridge. As consumers will not have tempered the chocolate, bloom will rapidly develop.

The bloom, although not hazardous, may be mistaken for mould growth and so consumers may discard the chocolate as unappetizing. Similarly, consumers may like to keep some of the chocolate-dipped items to eat at a later date or to use as gifts, but the appearance of fat bloom on the chocolate as it cools will make the chocolate-dipped items unappealing. Pre-packaged chocolate fondues are sold by a number of manufacturers. These often consist of a plastic tub containing a chocolate-like material. The tub can be placed directly in a microwave or in a bain-marie to melt the chocolate-like material at a temperature of around 60° C. The tub is then brought to the table where food items are dipped into it. To avoid the problem of bloom, these pre-packaged "chocolate fondues" generally contain fats other than those derived from milk and or cocoa and so cannot be sold as chocolate in many countries.

There is a need to find a solution to blooming in chocolates where the fat phase consists of cocoa butter and/or milk fat and/or cocoa butter and one or more emulsifier and the chocolate is liquefied and re-solidified without a farther pre-crystallisation step.

SUMMARY OF THE INVENTION

The present invention relates to a chocolate composition (c.f. claim 1)

FIGURES

FIG. 1 shows photographs of chocolates described in example 2 which have been heated to 60° C. in a microwave to simulate the preparation of a chocolate fondue and then allowed to cool and then stored at 20° C. for two weeks.

FIG. 2: Chocolate A, DSC heating traces as described in example 3

FIG. 3: Chocolate B, DSC heating traces as described in example 3

FIG. 4: Chocolate C, DSC heating traces as described in example 3

FIG. 5: Chocolate E, DSC heating traces as described in example 3

FIG. 6: Chocolate F, DSC heating traces as described in example 3

FIG. 7: Chocolate G, DSC heating traces as described in example 3

FIG. 8: Octadecane, DSC cooling traces as described in example 3

FIG. 9: Chocolate A, DSC cooling traces as described in example 3

FIG. 10: Chocolate B, DSC cooling traces as described in example 3

FIG. 11: Chocolate C, DSC cooling traces as described in example 3

FIG. 12: Chocolate E, DSC cooling traces as described in example 3

FIG. 13: Chocolate F, DSC cooling traces as described in example 3

FIG. 14: Chocolate G, DSC cooling traces as described in example 3

Figure 18:
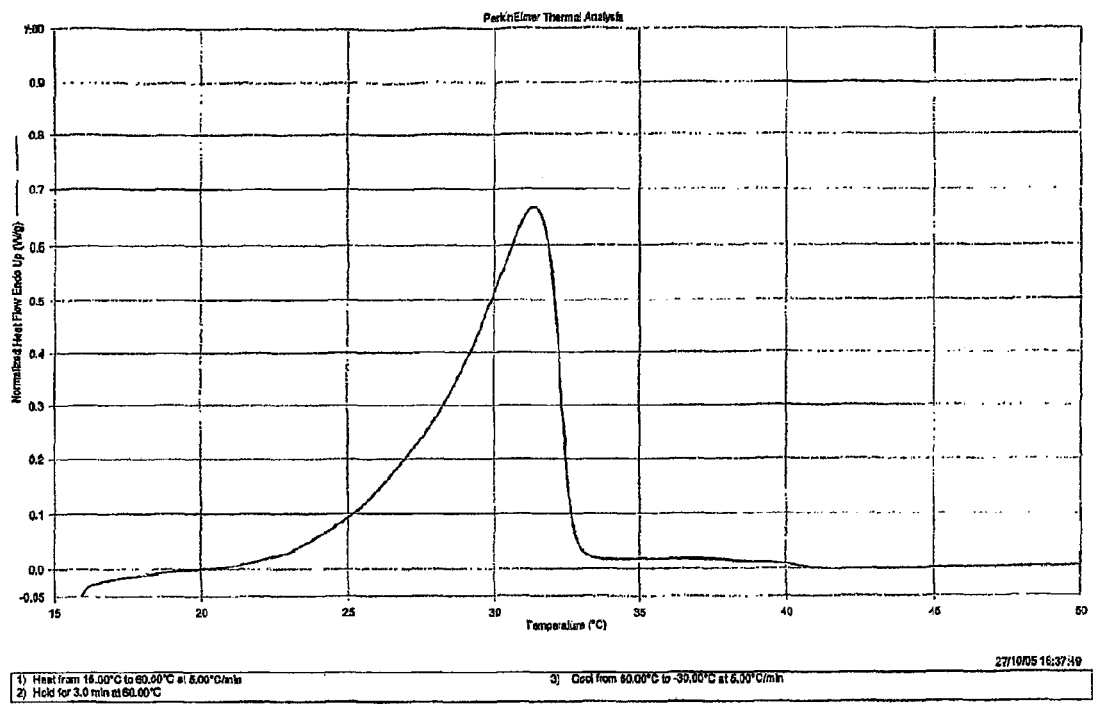

FIG. 18: Chocolate H, DSC heating traces as described in example 3

Figure 19:
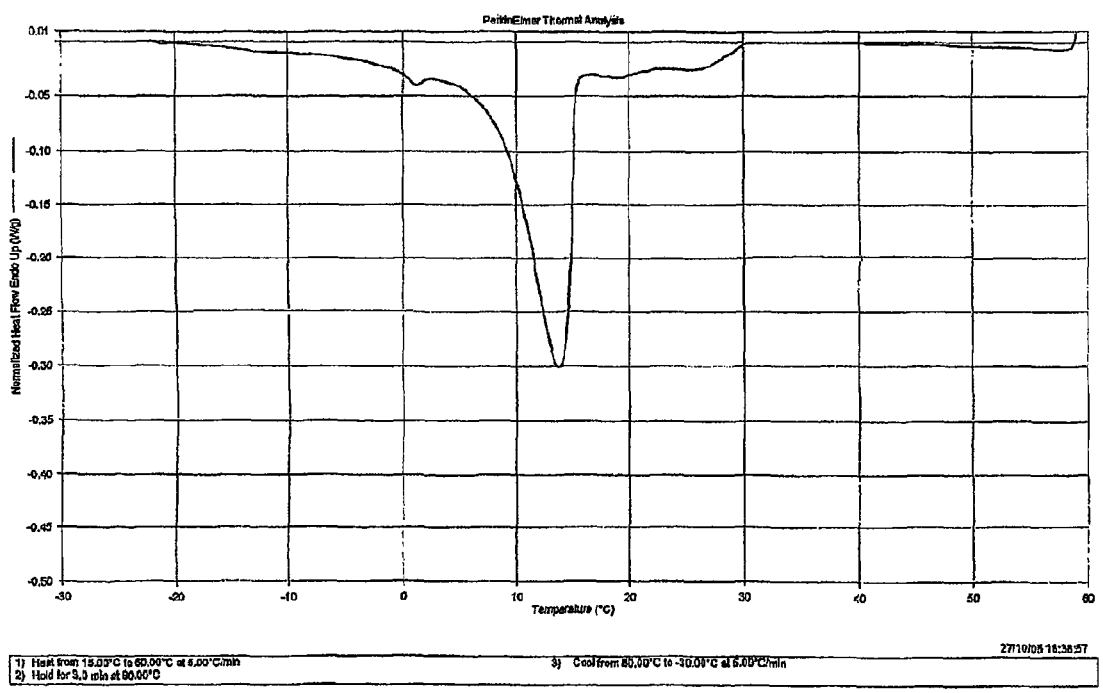

FIG. 19: Chocolate H, DSC cooling traces as described in example 3

DETAILED DESCRIPTION OF THE INVENTION

Accordingly, we have found a solution to the problem of blooming in chocolates where the fat phase consists of cocoa butter and/or milk fat and/or cocoa butter equivalents and one or more emulsifier and the chocolate is liquefied and re-solidified without a pre-crystallization step.

The physical and chemical properties of cocoa butter can vary due to the natural variability between different growing regions and the technological parameters applied to recover and refine the cocoa butter. Early-crystallizing refined cocoa butters are commercially available which exhibit modified crystallization behaviour such that tempering is not a critical step for good fat crystallization. However, the early-crystallizing component gives the cocoa butter a waxy mouthfeel which means that it has not been considered suitable for making chocolate.

Cocoa butter can also be heat treated, for example by heating it for 1 hour at 250° C. under vacuum as described in *Confectionery Fats Handbook*, R. E. Timms, The Oily Press (2003). This causes a change in the triglyceride composition, reducing the symmetrical triglycerides and increasing the trisaturated triglycerides, leading to a higher melting range than the starting material. Cocoa butter treated in this way is not considered suitable for use in chocolate due to its poor temperability and waxy mouthfeel, as is evident by the description used by Timms of this material as "heat-damaged" cocoa butter.

We have found surprisingly, that by blending early-crystallizing cocoa butter with standard cocoa butter and by the addition of a crystallization-modifying emulsifier we can produce a chocolate which can be liquefied and re-solidified without a pre-crystallization step without the formation of bloom. The chocolate has a pleasant, non-waxy mouthfeel. The absence of either the early-crystallizing cocoa butter or the crystallization-modifying emulsifier, or both, produced unsatisfactory results.

Chocolate is a fat matrix that comprises solid particles dispersed in it. The chocolate of the present invention comprises cocoa liquor and/or cocoa powder, cocoa butter and/or early-crystallizing cocoa butter, sugar and/or sugar replacers and at least one emulsifier. It can further comprise milk fat and/or vegetable fats both physically and chemically compatible with cocoa butter, as well as any other ingredient typically used in the chocolate industry. Examples of such ingredients include non-fat milk solids and flavours.

In the present specification, the terms "chocolate" and "chocolate composition" are used interchangeably. They refer to chocolates that are not restricted to what can legally be called chocolate, but can be used in many forms. For example, it can be used as a chocolate fondue, or as a material for making chocolate confectionery at home, where tempering skills and equipment are unlikely to be available. It can also be used for moulded chocolates, especially suitable in hot or tropical climates where chocolate blooming is a major problem. It can be use to make chocolate tablets, chocolate bars, chocolate centres, chocolate shapes or chocolate chips. The chocolate of the invention can also be used as a coating or enrobing chocolate. For example, it can be used to enrobe or to make chocolate layers with wafers, biscuits, mousses, sponge cakes, cereals, nuts, raisins, ice-creams, yoghurts, and in general dairy-based products as well as fat-based or sugar-based confectionery products.

The fat phase of the chocolate of the present invention comprises cocoa butter and optionally milk fat and/or cocoa butter equivalent fats. In the present specification, fat components present in an amount equal or less than 1% by weight in the total chocolate, such as emulsifiers, are not indicated separately from the fat phase, unless there is something unusual about the ingredient for a skilled person. Similarly, fats present due to the addition of whole or broken nuts are not indicated separately from the fat phase. Therefore, when in the present specification we discuss a chocolate or a chocolate composition wherein the fat phase comprise cocoa butter and optionally milk fat and/or cocoa butter equivalent, this chocolate composition may or may not contain an emulsifier, and may or may not contain fat from nuts. Cocoa butter equivalent fats are non-lauric vegetable fats obtained only by the processes of blending, refining and/or fractionation. The cocoa butter equivalents are rich in symmetrical monounsaturated triglycerides of the type palmitic-oleic-palmitic, palmitic-oleic-stearic and stearic-oleic-stearic. They require tempering and are miscible in any proportion with cocoa butter, and are compatible with its physical properties. The addition of lauric fats, animal fats, hydrogenated fats or fats where the triglyceride structure has been altered by enzymatic modification is generally not permitted in material sold as chocolate and is outside the scope of this invention.

In the present specification, by "nut" it is intended the general meaning of this word, i.e. any hard fruit that resembles a nut structure, and it may include walnut, cashew nut, coconut, almond, hazelnut, beechnut, brazil nut, chestnut, cobnut, filbert, macadamia, monkey nut, peanut, pecan or pistachio, alone or in combination, whole or broken.

The chocolate according to the invention shows a crystallization enthalpy between 35° C. and 20° C. of between 4 Joules and 12 Joules per gram of fat on cooling from 60° C. at 5° C./minute at conditions where octadecane shows a cooling trough minimum at 23.3° C.±0.2° C., method as used in example 3. For brevity, the enthalpy measured in this way will be referred to as the early-crystallizing enthalpy. Preferably, the chocolate according to the present invention has an early-crystallization enthalpy of between 4 and 10 joules per gram of fat, more preferably between 5 and 8 joules per gram of fat In a preferred embodiment of the invention, the early-crystallizing cocoa butter has a solid fat content at 35° C. greater than 2% (measured by Pulsed Nuclear Magnetic Resonance (pNMR) with thermal pre-treatment method as in example 5). The early-crystallizing cocoa butter used in this invention also shows an increase in the temperature at which the first crystals appear during cooling from the liquid state compared to standard cocoa butter. This is observed using a Differential Scanning Calorimeter (DSC) during cooling of the fat from 60° C. to −20° C. at 5° C./minute (method as used in example 3) by a distinctive exotherm with a peak between 20 and 35° C. where the major exothermic peak of the fat on cooling at this rate occurs between 20° and 5° (as for standard cocoa butter). The amount of early-crystallizing component in different sources of early-crystallizing cocoa butter will vary. Accordingly, the invention is described in terms of the crystallization enthalpy rather than as quantities of early-crystallizing cocoa butters added.

The fatty acid composition of the early-crystallizing cocoa butter used in the present invention is comparable with any other cocoa butter.

An example of a commercial early-crystallizing cocoa butter fitting the present definition and the purpose of the invention is "BC/50" sold by Eulip, Parma, Italy.

The crystallization-modifying emulsifier according to the present invention comprises at least one of sorbitan esters, sucrose esters, polyglycerol esters, lactylated mono- and diglycerides, polyoxyethylene sorbitan derivatives and diacetyl tartaric acid esters of mono- and di-glycerides (DATEM). Preferably the crystallization-modifying emulsifier is at least one of DATEM, sorbitan monostearate (SMS), sorbitan tristearate (STS), polyoxyethylene sorbitan monostearate (POE-SMS) and polyoxyethylene sorbitan tristearate (POE-STS). Most preferably the crystallization-modifying emulsifier is STS.

STS is a commonly used emulsifier in the food industry; it is used as an anti-crystalliser in cooking oil, and anti-sandiness agent in margarine and can act as an anti-bloom agent in chocolate.

Preferably, the early-crystallizing cocoa butter is present in an amount which gives an early-crystallization enthalpy between 4 and 12 J/g. With the synergistic effect of the early-crystallizing cocoa butter and the crystallization-modifying emulsifier is it possible to achieve a chocolate which not only doesn't bloom, but also doesn't have an unacceptably waxy mouthfeel. For example, a non-tempered dark chocolate with a fat phase showing an early-crystallization enthalpy of 6.4 J/g will show some bloom and a slightly waxy mouthfeel. Addition of STS to a chocolate of this composition will give excellent results regarding bloom resistance and remove the waxy mouthfeel. If the amount of early-crystallizing component is reduced, the chocolate will lose its resistance to bloom. If there is more of the early-crystallizing component, the chocolate becomes unacceptably waxy. The use of STS without the early-crystallizing cocoa butter does not prevent bloom when the chocolate is melted and resolidified. In the given range of the invention, the chocolate is not waxy at all or is scarcely waxy, and nevertheless presents a high anti-bloom effect.

The best results are obtained with a early-crystallizing cocoa butter used in such amounts to give an early crystallization enthalpy of between 4 and 12 J/g in combination with between 0.6 and 3% by weight of STS, based on the fat phase. Even more preferably, the fat phase of the chocolate according to the invention comprises 1.5% wt STS and a early-crystallizing cocoa butter in an amount to give an early-crystallization enthalpy of between 5 and 8 J/g.

The chocolate of the invention does not require to be tempered. However, tempering can be used advantageously to improve gloss, and to improve demoulding, particularly in compositions which have lower levels of the early-crystallizing cocoa butter component.

The chocolate of the invention is resistant to bloom. Fat bloom becomes visible when fat crystals on the surface grow larger than a critical size (about 4-5 microns). By bloom resistant we mean that less than 25%, preferably less than 10% and more preferably less than 5% of the surface of the chocolate is covered in visible white crystals after the product has been heated to around 60° C. and then cooled back down without a pre-crystallization step.

The chocolate of the invention can be shape-stable under conditions of elevated temperatures (up to 50° C.) such as might be encountered in tropical or desert climates, for example by the use of amorphous sugar as described in CH399891 or by the addition of polyols as described in EP0637420.

The chocolate of the invention can further be coloured and/or flavoured.

EXAMPLES

Example 1

A series of 8 plain chocolates were conventionally produced with the following general composition:

| | % |
|---|---|
| Sugar | 46.9 |
| Fat reduced cocoa powder (10-12% fat) | 21.0 |
| Added fat/emulsifier mix | 32.0 |
| Lecithin | 0.1 |
| Flavour | <0.05 |

An early-crystallizing cocoa butter (BC-50, Eulip), a standard cocoa butter ("Astra A" Pure Prime Pressed Cocoa Butter, ADM Cocoa B.V.), milk fat and sorbitan tristearate (GRINDSTED® STS 30 KOSHER) were mixed in different proportions to form the "added fat/emulsifier mix" of the general composition above. The composition of the fat phase of the 8 chocolates labelled A to H is tabulated below (assuming fat reduced cocoa powder contains 11% cocoa butter and ignoring lecithin).

TABLE 1

| | Fat phase composition (%) | | | |
|---|---|---|---|---|
| Chocolate | Early-crystallizing cocoa butter | Standard Cocoa Butter | Milk fat | STS |
| A | 30 | 70 | 0 | 0 |
| B | 30 | 68.5 | 0 | 1.5 |
| C | 15 | 76 | 7.5 | 1.5 |
| D | 15 | 77.5 | 7.5 | 0 |
| E | 0 | 92.5 | 7.5 | 0 |
| F | 0 | 98.5 | 0 | 1.5 |
| G | 0 | 100 | 0 | 0 |
| H | 15 | 83.5 | 0 | 1.5 |

The chocolates at 50° C. were passed through a scraped surface heat exchanger with cooling water set at 20° C. to cool the chocolates to around 30° C., at which point they were filled into plastic tubs and allowed to solidify at 17° C.

Example 2

After 1 day at room temperature (20° C.), the chocolates from example 1 were tasted by a small "Sensory Analysis Consensus Panel" who agreed descriptions of the mouthfeel for the five samples (table 2).

Figure 17:
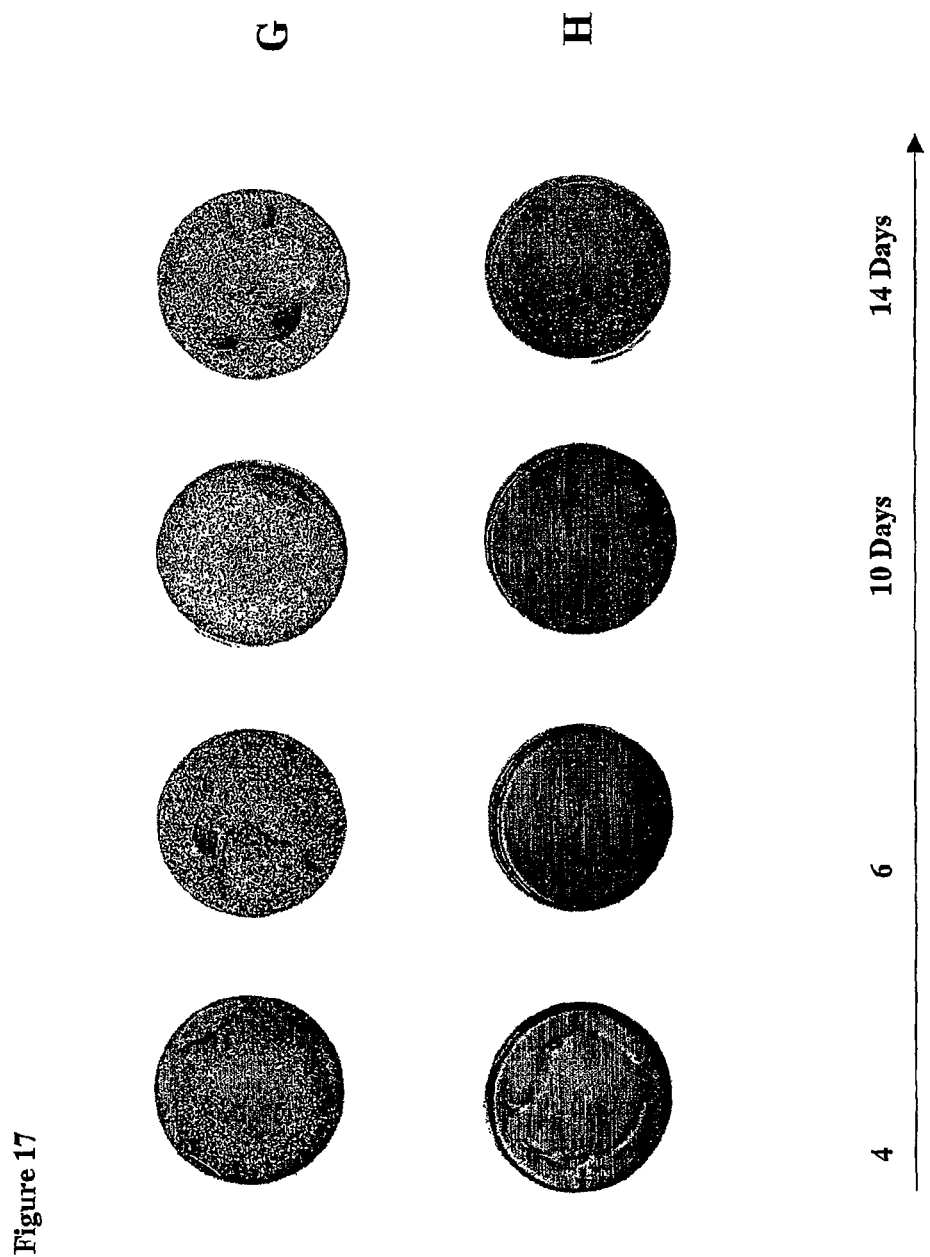
FIG. 17 shows photographs taken from above at different time intervals of two chocolates described in example 2 which have been heated to 60° C. in a microwave to simulate the preparation of a chocolate fondue and then allowed to cool and then stored at 20° C. for two weeks.

Tubs of each chocolate were heated to 60° C. in a microwave to simulate the preparation of a chocolate fondue. The tubs were allowed to cool and then stored at 20° C. for two weeks before being examined, The degree of blooming was noted (table 2), and photographs taken. A series of photographs was taken of samples G and H to show the evolution of bloom over time (FIG. 17).

TABLE 2

| Chocolate | Bloom | Mouthfeel |
|---|---|---|
| A | No bloom | Very waxy |
| B | No bloom | Very waxy |
| C | No bloom | Slow melting but not waxy |
| D | Some bloom | Slightly waxy |
| E | Severe bloom | Not waxy |
| F | Severe bloom | Not waxy |
| G | Severe bloom | Not waxy |
| H | Very slight bloom | Very slightly waxy |

It can be seen that the overall effect of reducing the amount of early-crystallizing cocoa butter is to reduce the waxy mouthfeel but increase bloom. Without the addition of STS, the chocolate will bloom at a level of early-crystallizing cocoa butter which is already slightly waxy (sample D). Surprisingly, addition of STS (sample C) both eliminates the bloom and the waxy mouthfeel. Milk fat is not essential to obtain bloom resistance and an acceptable mouthfeel (sample H).

Example 3

The chocolate samples of example 1 were analysed using Differential Scanning Calorimetry (DSC) and Gas Chromatography (GC).

In Differential Scanning Calorimetry a sample and a reference are heated or cooled at a controlled rate and the difference in heat flow between the sample and the reference is measured. Typically, and in this study, the reference is an empty pan. If the sample gives out heat, for example due to a crystallization event, an exothermic heat flow is measured, indicated by a trough in the DSC trace for this study, whereas if the sample requires more heat than the reference, for example due to melting, then an endothermic heat flow is measured, indicated by a peak in the DSC trace. DSC analysis was performed using a Perkin Elmer DSC7 with Perkin Elmer Pyris software to analyse the data. The DSC was calibrated in the usual way, using an Indium standard.

Before DSC analysis the chocolates were stored for 2 months at 20° C. Small samples of the chocolates were weighed and sealed in aluminium pans. The thermal analysis involved heating the sample from 15° C. to 60° C. at a rate of 5° C./minute whilst recording the resultant heat flow (melting curve), holding the sample at 60° C. for 3 minutes and then cooling the sample to −30° C. at a rate of 5° C./minute and recording the heat flow (cooling curve). The same thermal analysis was also applied to a sample of octadedane (Fluka Octadecane 74691 Puriss p.a. standard for GC).

Figure 1:
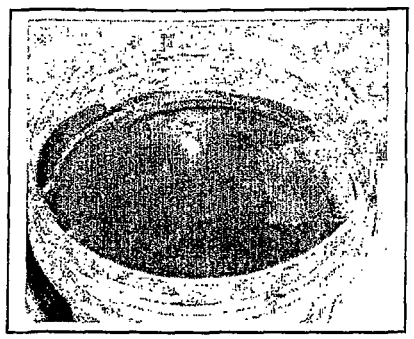
Figure 1:
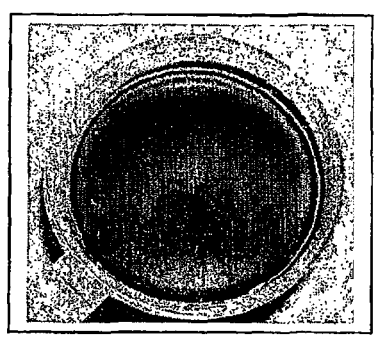
Figure 1:
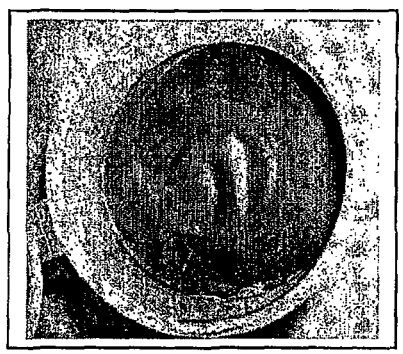
Figure 1:
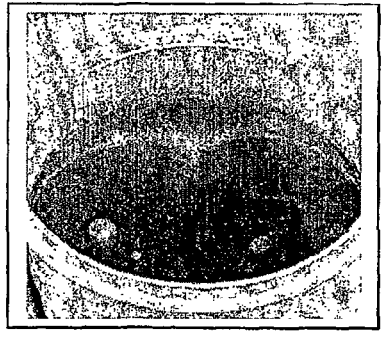
Figure 1:
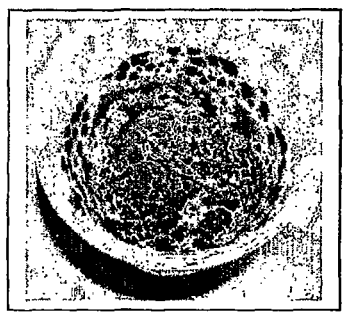
Figure 1:
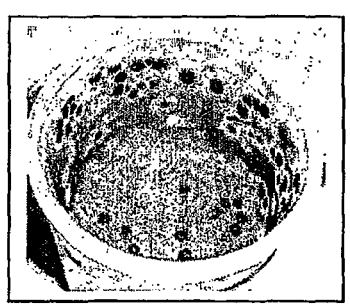
Figure 1:
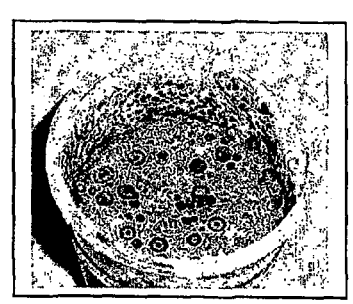
Figure 2:
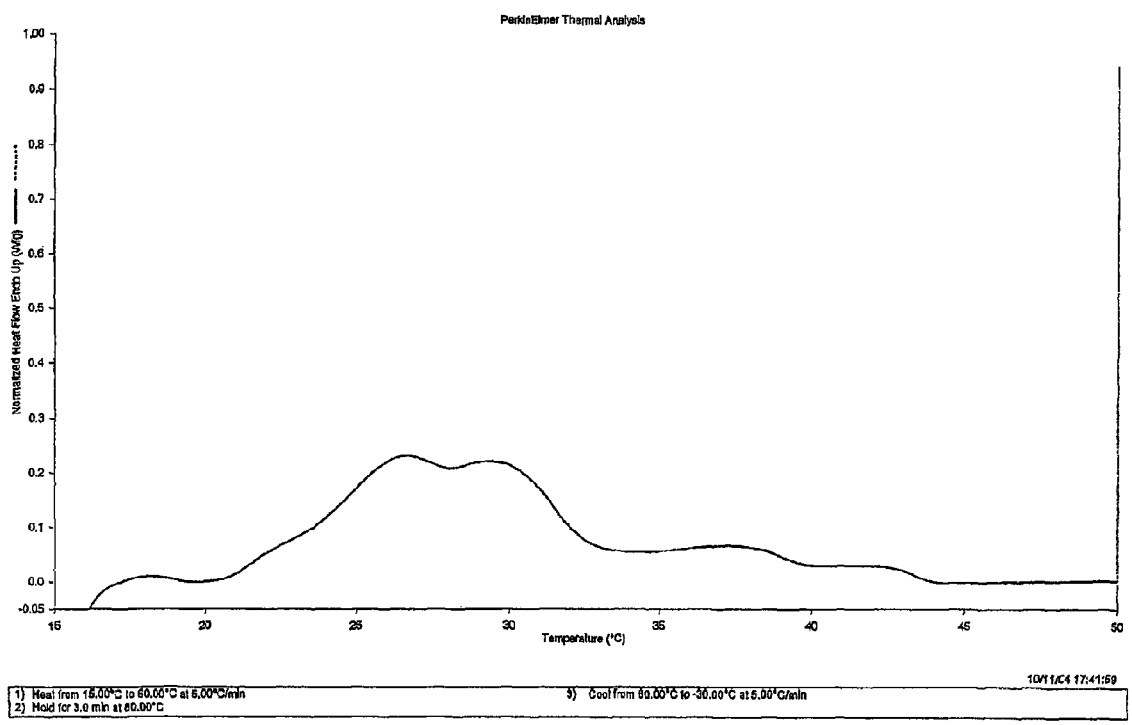
Figure 3:
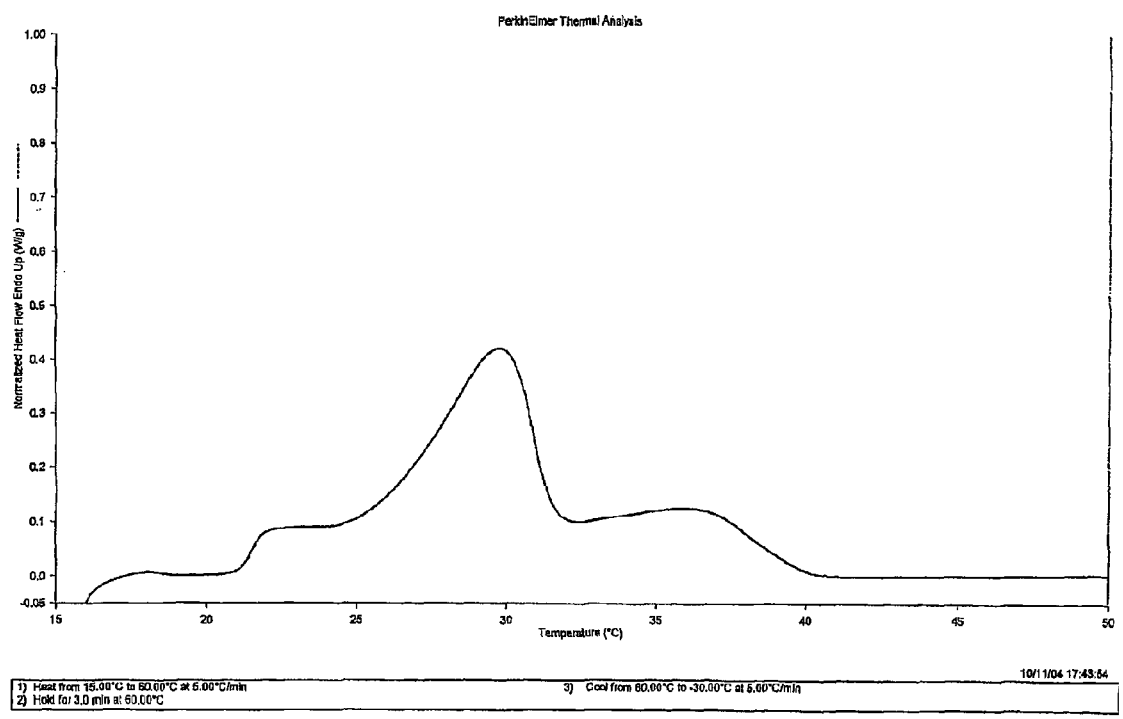
Figure 4:
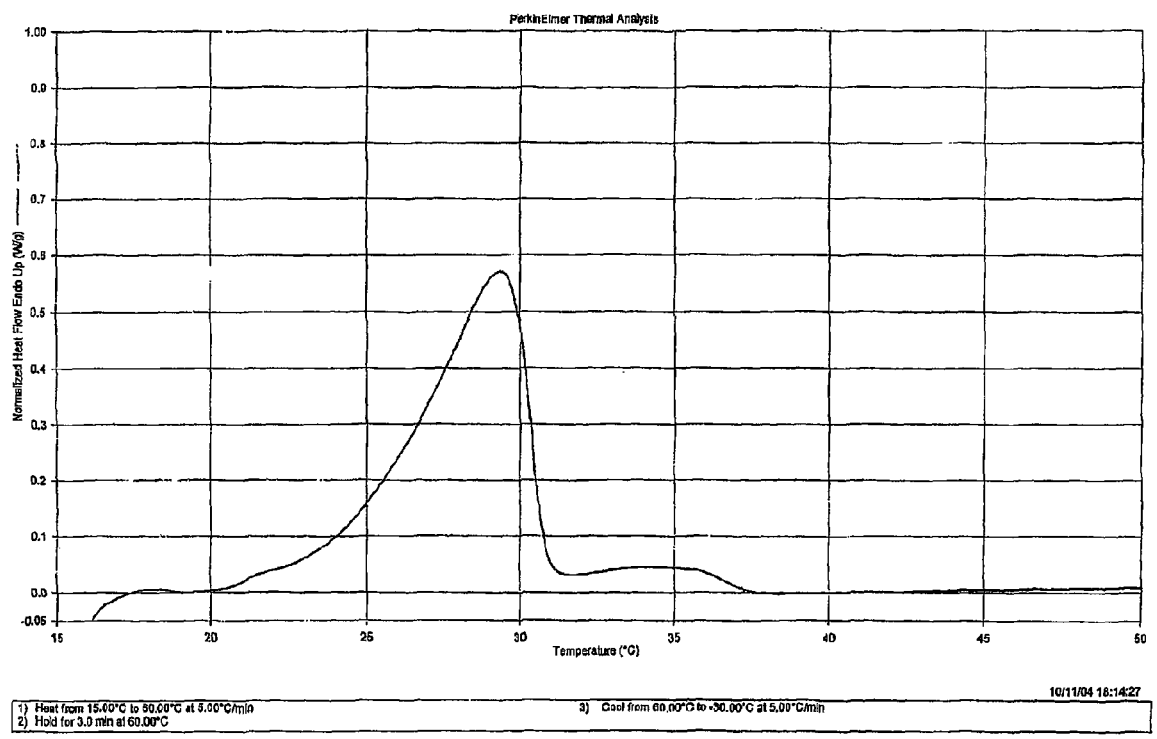
Figure 5:
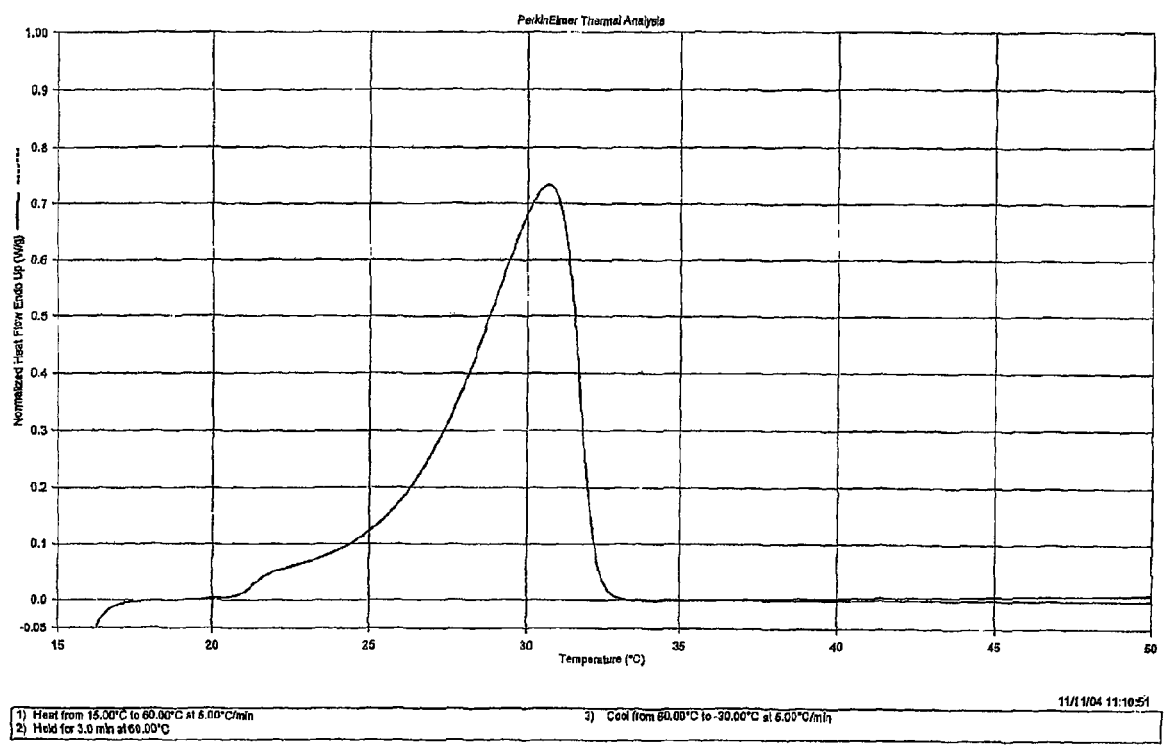
Figure 6:
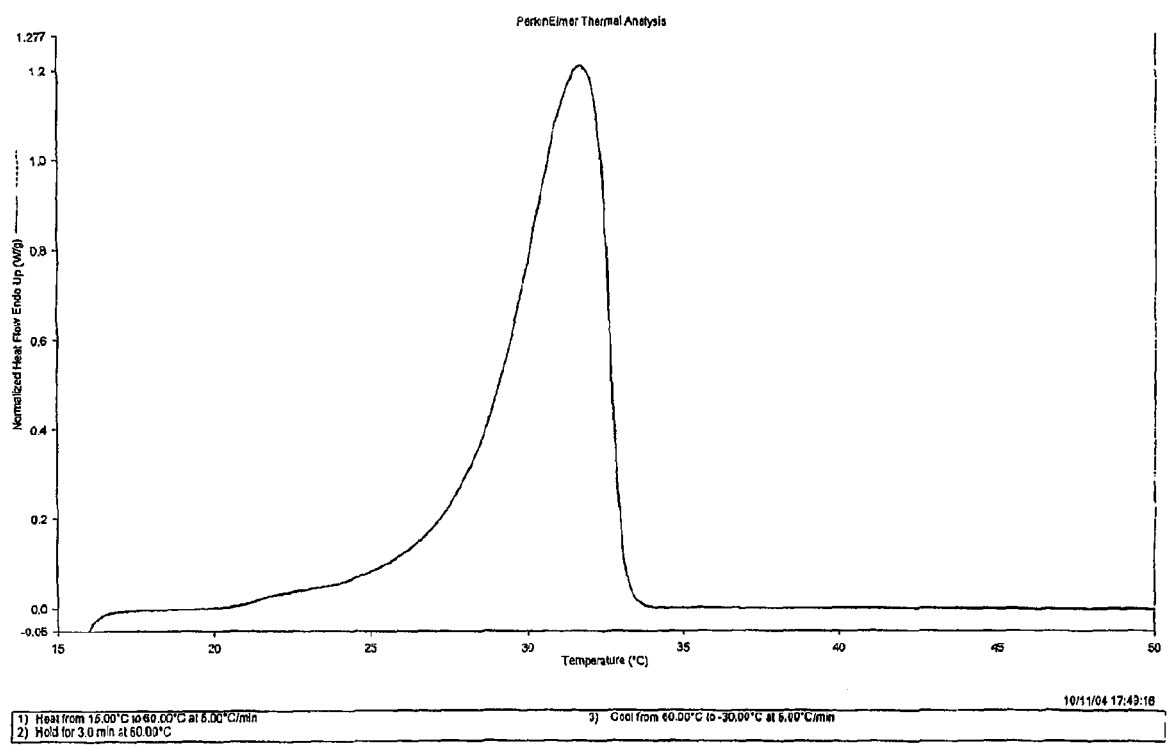
Figure 7:
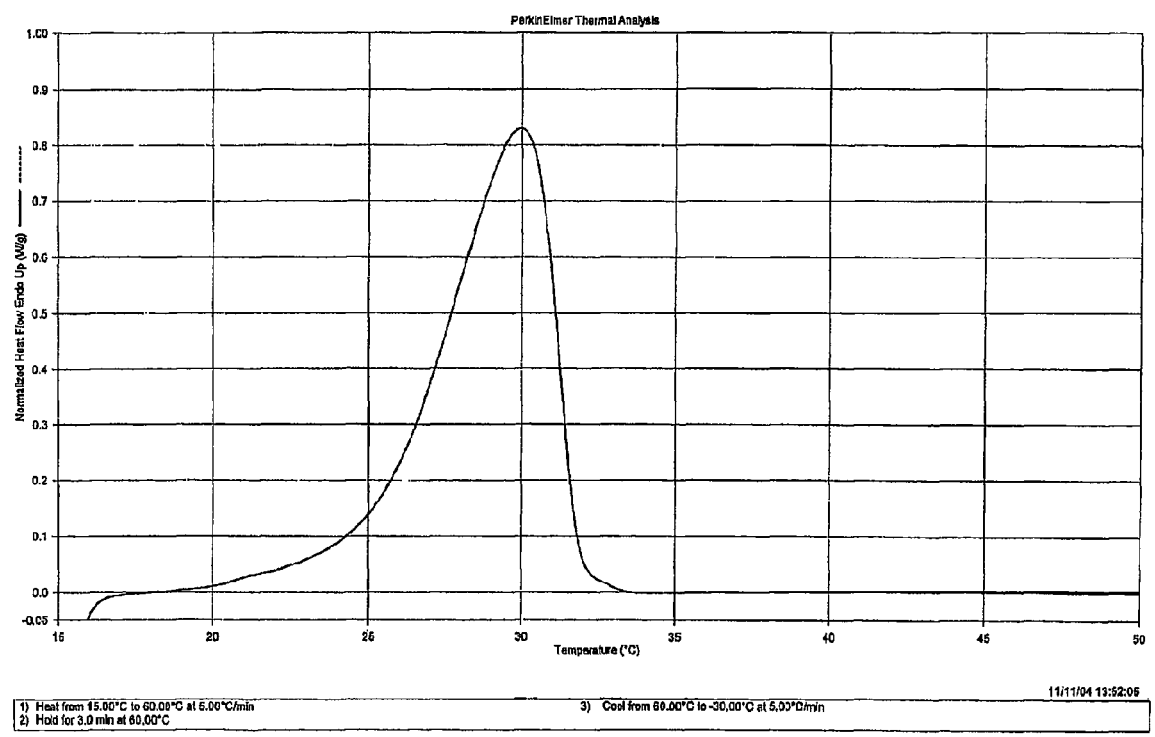
Figure 8:
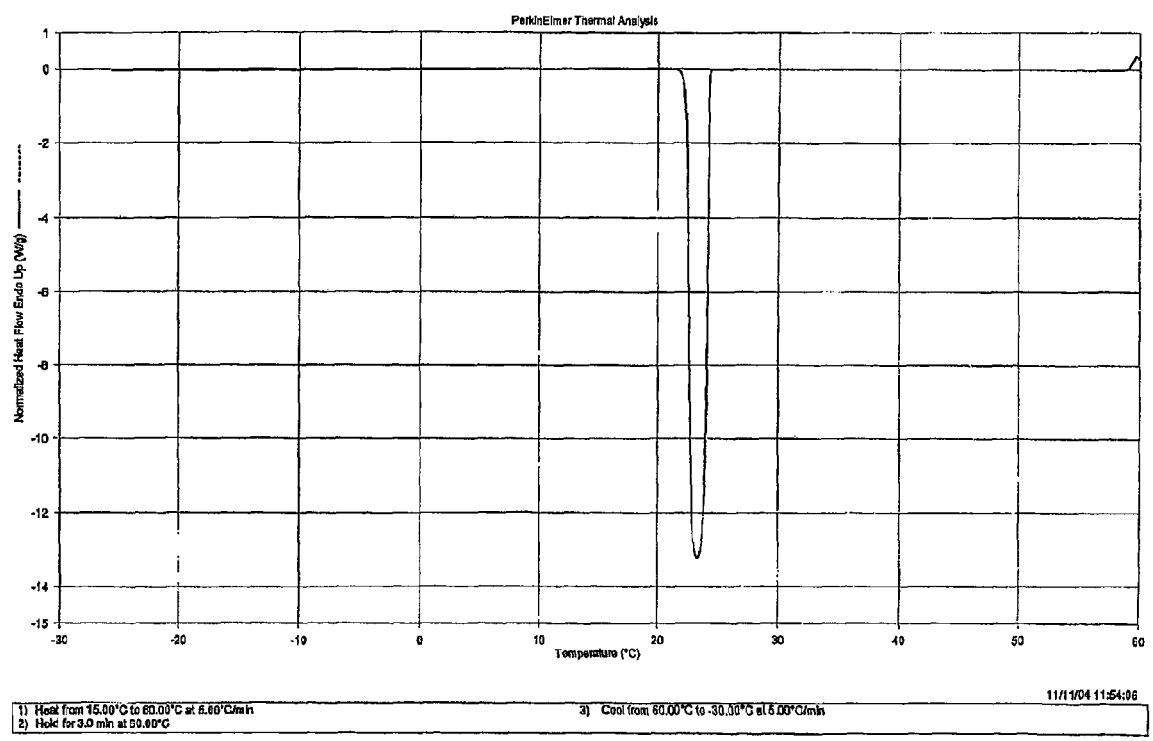
Figure 9:
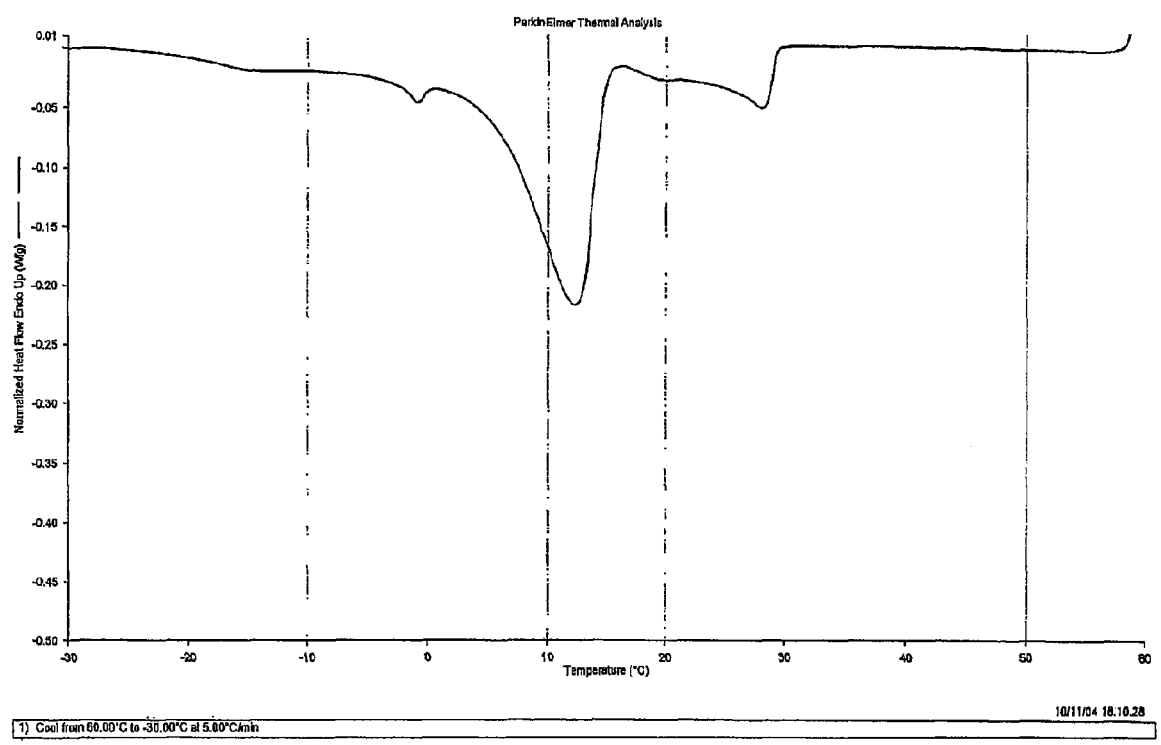
Figure 10:
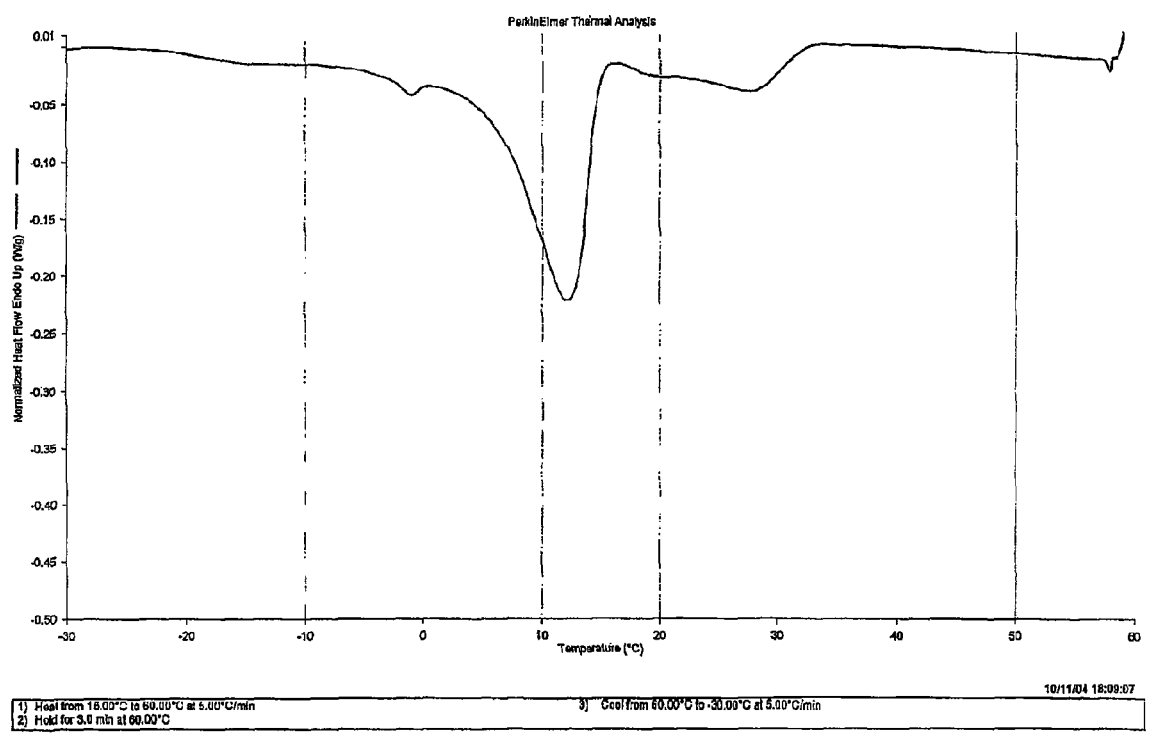
Figure 11:
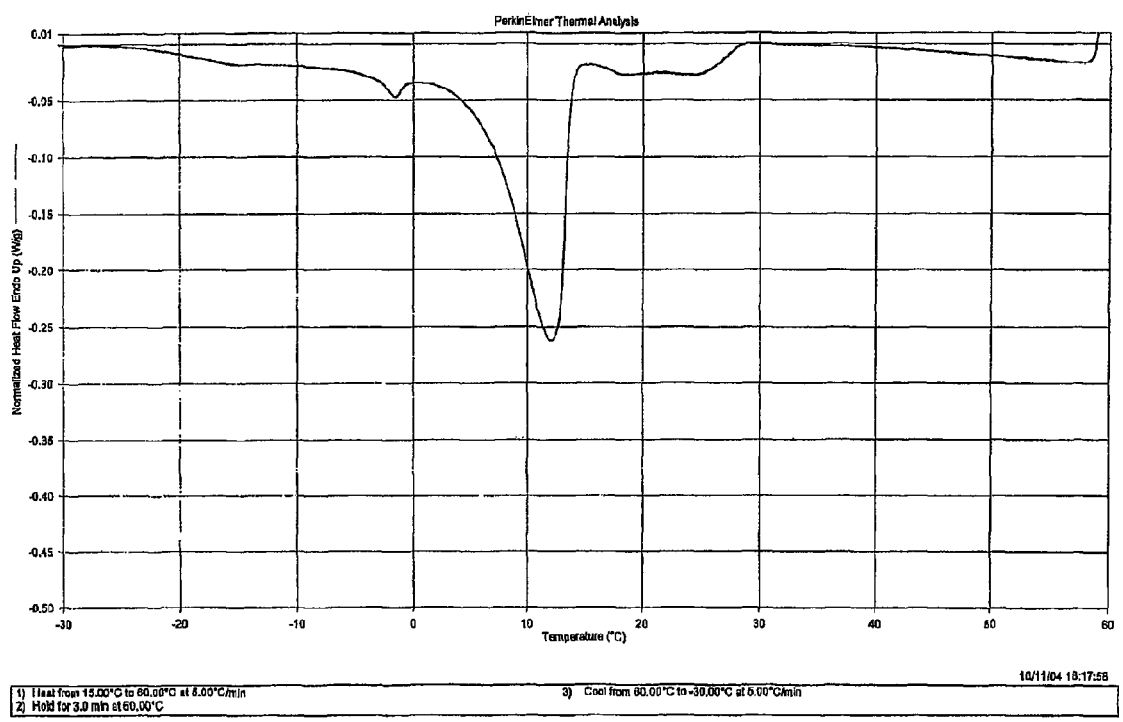
Figure 12:
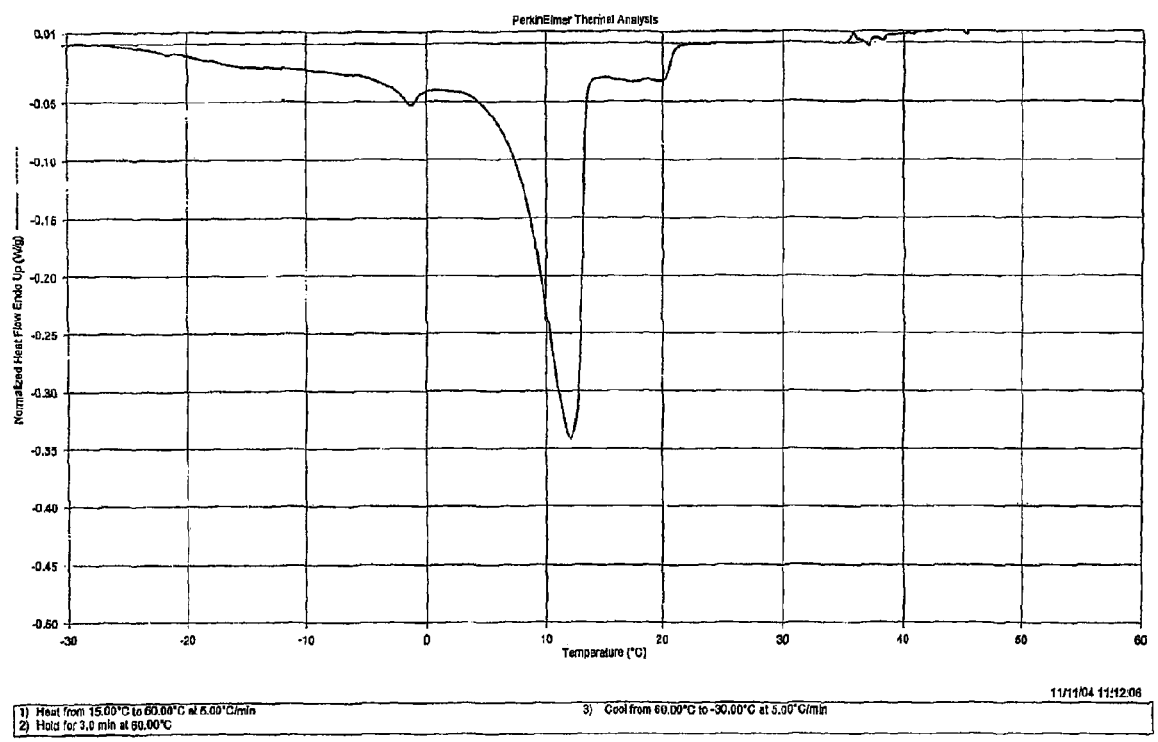
Figure 13:
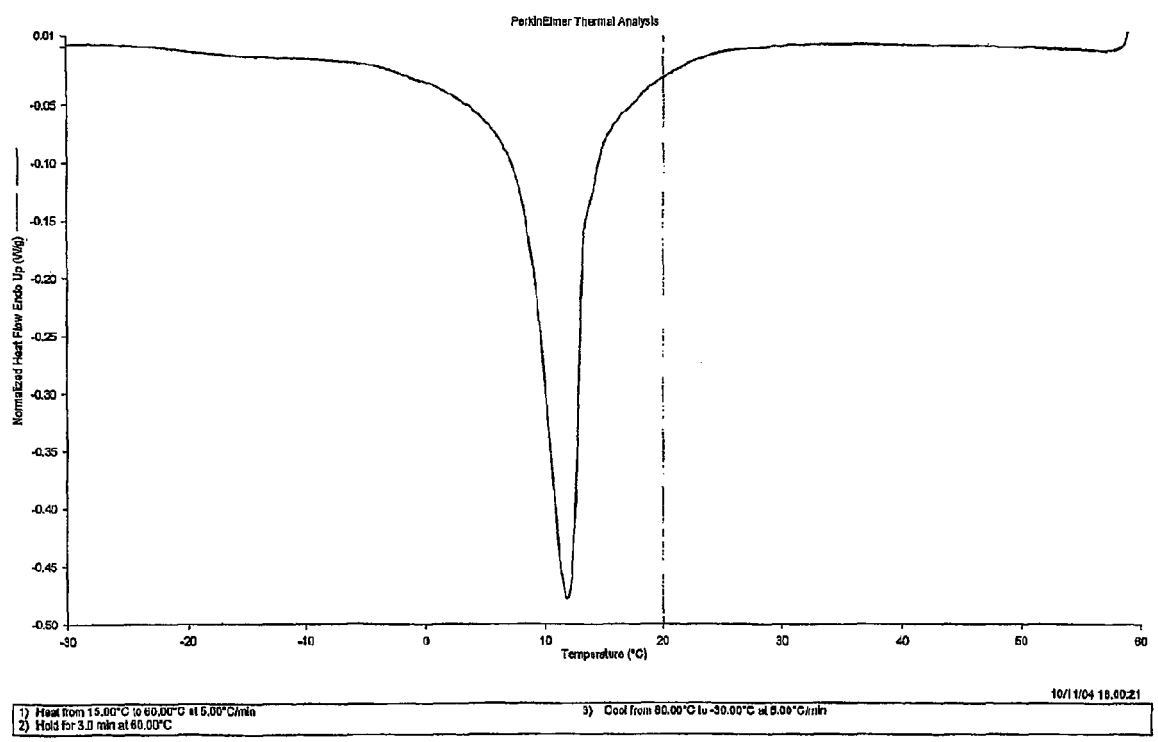
Figure 14:
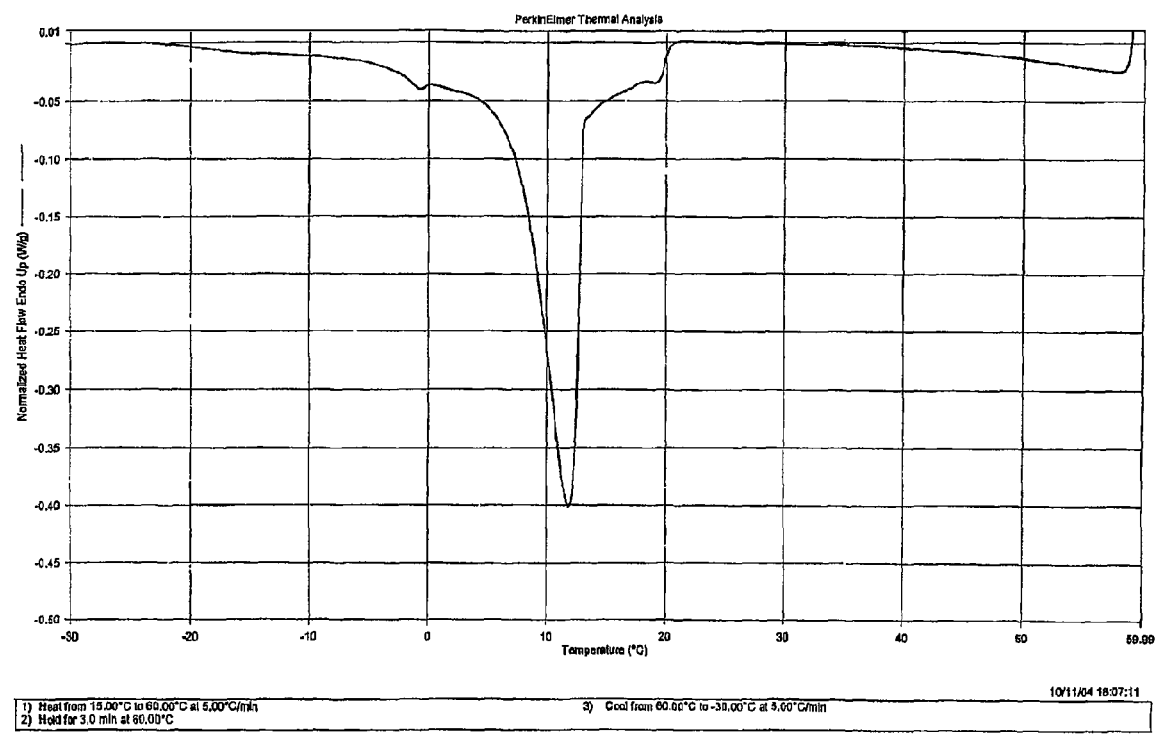
Figure 15:
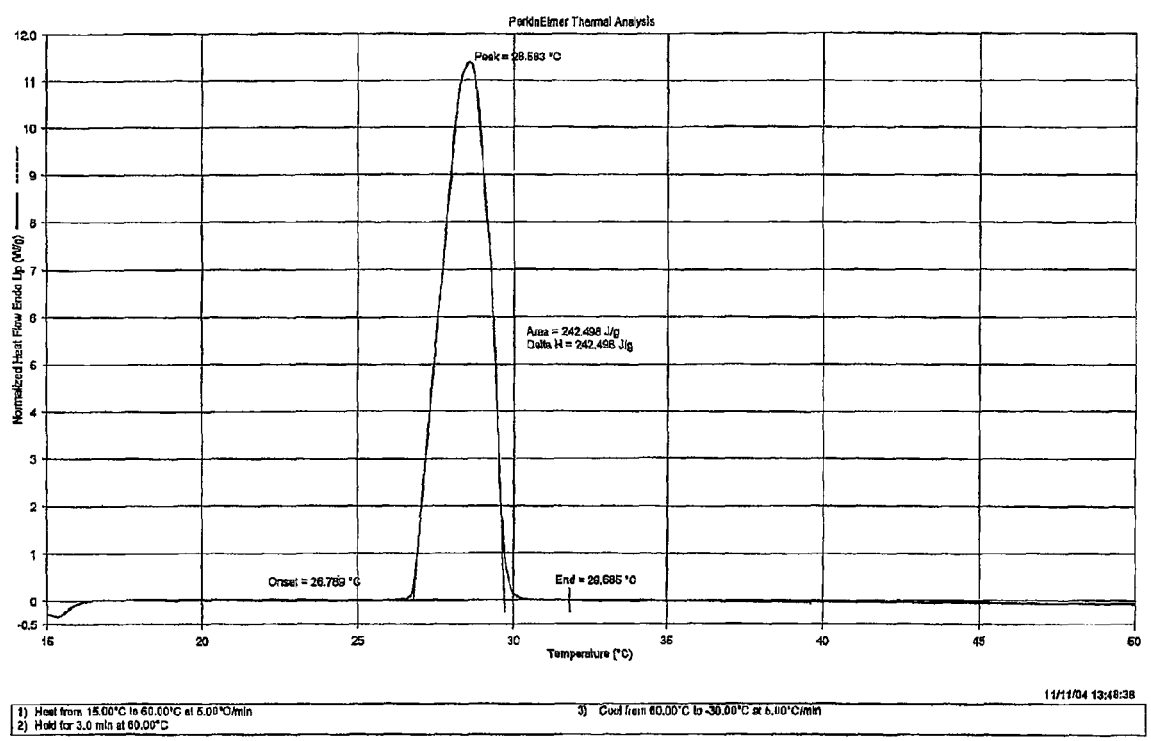
FIG. 15 is a heating curve for octadecane as described in example 3
Figure 16:
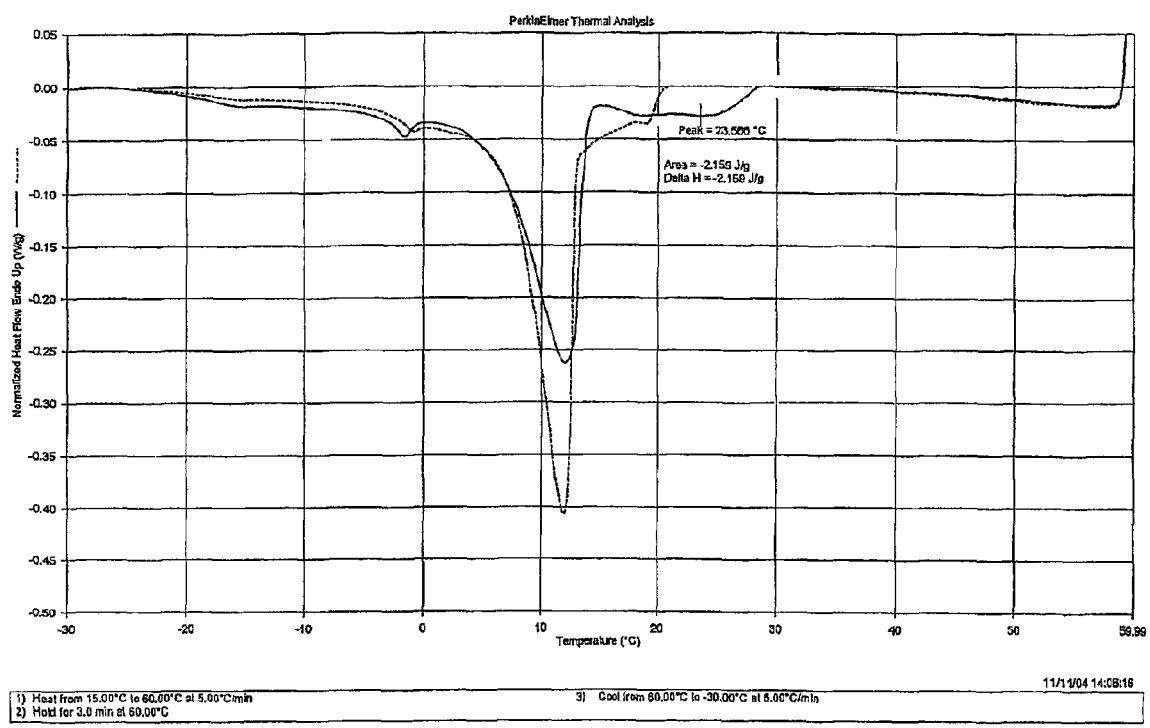
FIG. 16 is a combined cooling curve plot for chocolates G and C.

The resulting traces are shown in FIGS. 2-15 and 18-19. The effect of the early-crystallizing cocoa butter can be most clearly seen in sample A with a significant trough between 35° C. and 20° C. in the cooling curve (FIG. 9) due to the early-crystallizing component which is not present for sample G (FIG. 14). The melting curve for sample A also shows two melting peaks above 33° C. (FIG. 2) which are not present for standard cocoa butter, sample G (FIG. 7).

The influence of STS on waxiness can be seen in the melting curve of sample B (FIG. 3), where the peak above 40° C. present in sample A (FIG. 2) has disappeared. At this level of early crystallizing cocoa butter however, the chocolate is still perceived as waxy.

The influence of the early crystallizing cocoa butter is of course less in sample C, but the trough between 35° C. and 20° C. during cooling is still visible (FIG. 11) and a direct comparison between sample G and sample C is made in FIG.

16 to show the distinctive trough between 35° C. and 20° C. characteristic of this invention. The area of the trough between 35° C. and 20° C. for sample C is measured as 2.159 J/g (continuing the baseline from the right hand side). As sample C is a chocolate containing 34% fat, the enthalpy of the crystallization between 35° C. and 20° C. is around 6.4 J/g of fat.

Enthalpies of crystallization between 35° C. and 20° C. can be measured in the same way for other samples. For example, Sample B has an enthalpy of 12.6 J/g on a fat basis and Sample H has an enthalpy of 7.5 J/g on a fat basis. It can be seen that with standard cocoa butter and STS (sample F, FIG. 13) the presence of STS has broadened the crystallization trough somewhat so that it slightly extends above that of cocoa butter alone (FIG. 14). However, in this case, an enthalpy of crystallization between 35° C. and 20° C. is measured as only 3.3 J/g on a fat basis.

The minima of the cooling peak for octadecane under these conditions (FIG. 8) was 23.3° C.

Example 4

The fat present in the chocolate samples of example 1 was extracted by Soxhlet extraction and then analysed using Gas Chromatography (GC) to identify and quantify the triglycerides present.

1 ml hexane was added to 1 drop (approx 10 mg) of melted fat and then mixed thoroughly. The analysis was carried out by GC fitted with a Flame Ionisation Detector. The column used was a DB17-HT (coating (50%-Phenyl)-methylpolysiloxane, length: 30 m, internal diameter: 0.25 mm, film thickness: 0.15 μm). 1 μl of sample was injected manually. The inlet temperature was set to 360° C., split mode was used and the oven temperature was ramped up to 340° C. Identification of triglyceride species was done by retention time comparison with an external standard. Response factors are applied, calculated from authentic reference sample mixtures. Triglyceride profile or triglyceride quantification was determined by the percentage of each detected species relative to the total peak area (normalisation to 100%).

Selected triglycerides (average of 2 determinations) are given in the table below.

TABLE 3

| Triglyceride | Sample C | Sample G |
| --- | --- | --- |
| PPP | 1.2 | 0.3 |
| PPS | 3.1 | 1.0 |
| POP | 15.0 | 14.7 |
| PSS | 3.3 | 1.2 |
| POS | 46.8 | 50.1 |
| POO | 3.5 | 3.0 |
| PLS | 1.1 | 1.5 |
| PLO | 0.3 | 0.2 |

TABLE 3-continued

| Triglyceride | Sample C | Sample G |
| --- | --- | --- |
| SSS | 0.5 | 0.3 |
| SOS | 15.2 | 18.6 |
| SOO | 3.1 | 3.0 |
| SLS + OOO | 0.6 | 0.2 |

Key:
P = Palmitic (C16:0 saturated)
O = Oleic (C18:1 unsaturated)
S = Stearic (C18:0 saturated)
L = Linoleic (C18:2 unsaturated)

It can be seen that there is a small reduction in symmetrical triglycerides (Saturated-Unsaturated-Saturated, such as POP, POS and SOS) and an increase in trisaturated triglycerides (such as PPP, PPS, PSS) in the chocolate of this invention (Sample C), compared to normal cocoa butter (Sample G).

Example 5

The solid fat content of the chocolate samples (extracted fat) of example 1 were analysed using low resolution pulsed Nuclear Magnetic Resonance (pNMR). A thermal pre-treatment was used; 60 mins at 80° C., 30 mins at 60° C., 90 mins at 0° C., 40 hours at 26° C. and 90 mins at 0° C. Each sample was then equilibrated for 30 minutes at each measurement temperature before being measured. Results for chocolates C and G are given in the table below.

TABLE 4

| Sample | SFC/% 0° C. | SFC/% 5° C. | SFC/% 10° C. | SFC/% 15° C. | SFC/% 20° C. | SFC/% 25° C. | SFC/% 30° C. | SFC/% 35° C. |
| --- | --- | --- | --- | --- | --- | --- | --- | --- |
| G | 91 | 89 | 85 | 80 | 74 | 66 | 42 | 0 |
| C | 86 | 84 | 79 | 68 | 51 | 44 | 27 | 1 |

The invention claimed is:

1. Chocolate composition comprising at least one crystallization-modifying emulsifier in an amount from about 0.6% to about 3% by weight of a fat phase, wherein the fat phase comprises an early-crystallizing cocoa butter in an amount from about 15% to about 30% by weight to impart to the chocolate composition a crystallization enthalpy of greater than 4 joules per gram of fat.

2. Chocolate composition according to claim 1 wherein the chocolate composition has a crystallization enthalpy of between 4 and 12 joules per gram of fat.

3. Chocolate composition according to claim 1 wherein the crystallization-modifying emulsifier is at least one emulsifier selected from the group consisting of sorbitan esters, sucrose esters, polyglycerol esters, lactylated mono- and di-glycerides, polyoxyethylene sorbitan derivatives and diacetyl tartaric acid esters of mono- and di-glycerides.

4. Chocolate composition according to claim 1 wherein the chocolate composition is tempered.

5. Chocolate composition according to claim 1 further comprising cocoa butter equivalents comprising fats selected from the group consisting of illipe, palm-oil, sal, shea, kokum gurgi, mango kernel and combinations thereof.

6. Chocolate composition according to claim 1 wherein the fat phase comprises STS.

7. Chocolate composition according to claim 1 wherein the chocolate composition is in a form selected from the group consisting of a chocolate fondue, a chocolate tablet, and a chocolate bar.

8. Chocolate composition according to claim 1 comprising nuts added to the chocolate.

9. Chocolate composition according to claim 1 where the chocolate is bloom resistant and shape stable under elevated temperatures.

10. A method of producing chocolate comprising the step of using a combination of early-crystallizing cocoa butter in an amount from about 15% to about 30% by weight of a fat phase and STS in an amount from about 0.6% to about 3% by weight of the fat phase in a chocolate as an anti-bloom agent, the chocolate having an early-crystallization enthalpy of greater than 4 joules per gram of fat.

11. Chocolate composition according to claim 1 wherein the chocolate composition has an early-crystallization enthalpy of between 4 and 10 joules per gram of fat.

12. Chocolate composition according to claim 1 wherein the chocolate composition has an early-crystallization enthalpy of between 5 and 8 joules per gram of fat.

13. The chocolate composition of claim 1 wherein the fat phase comprises milk fat.

* * * * *